J. B. WARING.
Tripods for Rock-Drilling Machines.
No. 156,003. Patented Oct. 13, 1874.
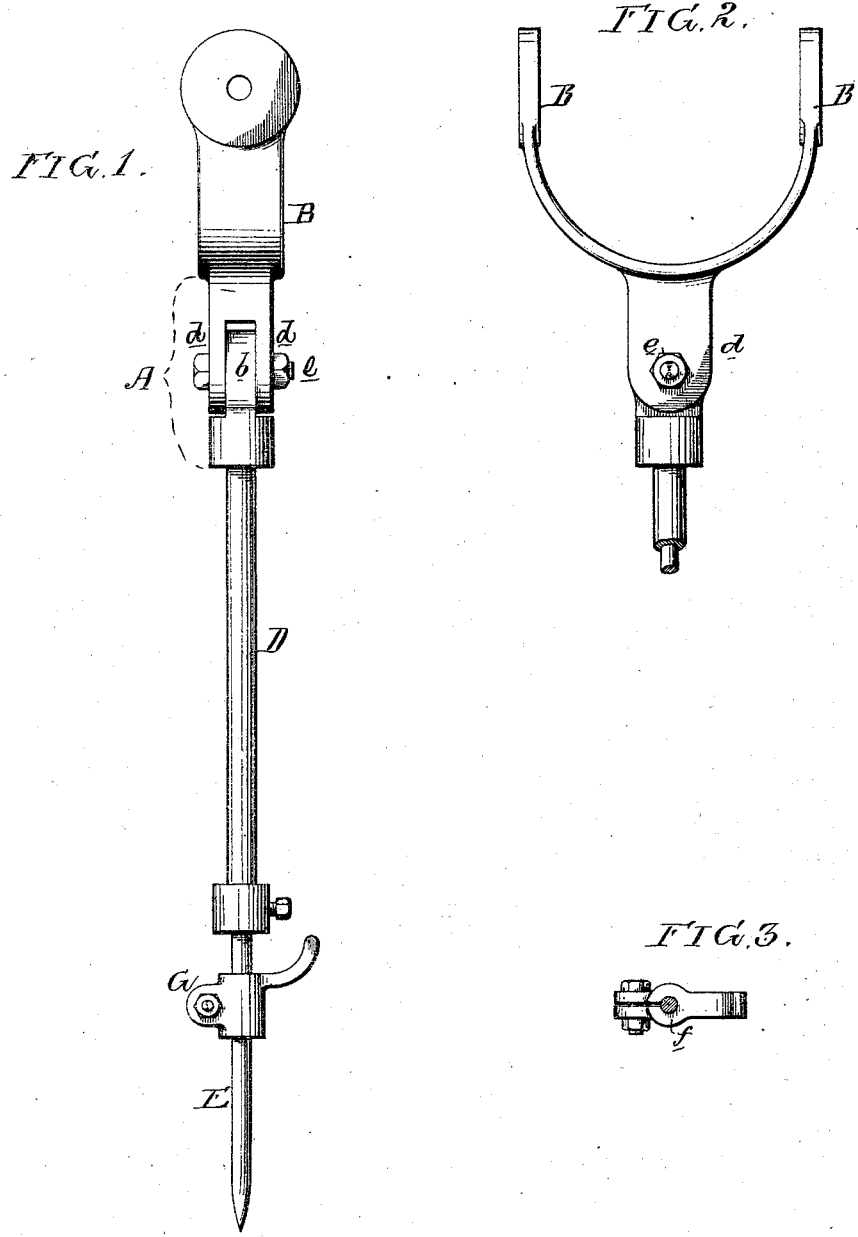

UNITED STATES PATENT OFFICE.

JOHN B. WARING, OF NEW YORK, N. Y., ASSIGNOR TO THE WARING ROCK-DRILL COMPANY.

IMPROVEMENT IN TRIPODS FOR ROCK-DRILLING MACHINES.

Specification forming part of Letters Patent No. 156,003, dated October 13, 1874; application filed June 5, 1874.

*To all whom it may concern:*

Be it known that I, JOHN B. WARING, of the city, county, and State of New York, have invented certain Improvements in Tripods for Rock-Drilling Machines, of which the following is a specification:

My invention relates to an improvement in the tripod for rock-drilling machines for which Letters Patent were allowed to me on the 21st of February, 1874; and the object of my invention is to obtain increased facilities for adjusting the said tripod by means of a joint, A, in the rear leg, as shown in the side view, Fig. 1, and end view, Fig. 2, of the accompanying drawing. A further object of my invention is to so improve the weight-supporting hooks G of the legs that it may be more securely fastened to the leg.

In my said application, the rear leg of the tripod was composed of but two pieces, so that the capacity for the adjustment of this leg was limited to its inward and outward movement in one direction only, and to the lengthening and shortening of the leg.

By my present improvement, a lateral adjustability of the rear leg is obtained, and this adds to the value of the tripod, as the latter can be more readily adjusted in many localities.

The upper forked portion B of the leg is connected to the front legs, and to the frame of the tripod, in the manner described in my aforesaid application; but instead of the tubular portion of the leg forming part of or being rigidly connected to the forked portion, the two are connected together by a joint, A, which, in the present instance, is made by a projection, b, at the upper end of the tubular portion of the leg, fitting snugly between two lugs, d d, on the forked portion, a bolt, e, passing through the lugs and projection, so that the lower portion of the leg, below the joint, may be adjusted laterally to any desired position. It is evident that a joint, A, of a different character, may be used without departing from invention. A ball-and-socket joint might, for instance, be employed. In the tubular portion of the leg fits a rod, E, pointed at the lower end, so that it can be readily and securely lodged in any crevice in the rock, this rod being adjustable in the tubular portion D, so that the leg may be lengthened or shortened at pleasure. The rod E is also furnished with an adjustable weight-supporting hook, G, which, instead of being secured by a set-screw, as in my former application, is made in the manner illustrated in the plan view, Fig. 3, on reference to which it will be observed that the annular portion *f* of the hook is split, and has projections through which passes a bolt, so that on tightening the latter the hook will be clamped securely to the rod, a much more certain mode of fastening than the ordinary set-screw. Heretofore the weight-supporting hook G has been secured to the upper tubular portion D of the leg instead of to the extension or rod E. By attaching it to the latter, I am enabled to adjust the weight to a much lower point on the leg, which is advantageous in many cases.

I claim as my invention—

1. The within-described rear leg of a tripod, jointed at A, as and for the purpose set forth.

2. The weight-supporting hook, consisting of a split hub or ring adapted to the rod, a screw for tightening the ring, and a projection forming part of the ring, and adapted to the weight, all as set forth.

In testimony whereof I have signed my name to this specification in the presence of two subscribing witnesses.

J. B. WARING.

Witnesses:
 WM. A. STEEL,
 HARRY SMITH.